(12) United States Patent
Ma et al.

(10) Patent No.: US 9,864,551 B2
(45) Date of Patent: Jan. 9, 2018

(54) DETERMINING THROUGHPUT BASED ON SYSTEM BUSY LEVEL

(71) Applicant: Hewlett-Packard Enterprise Development LP, Houston, TX (US)

(72) Inventors: Ming Ma, Santa Clara, CA (US); Siamak Nazari, Mountain View, CA (US); James R Cook, Bellevue, WA (US); T. David Evans, Duvall, WA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 51 days.

(21) Appl. No.: 14/473,582

(22) Filed: Aug. 29, 2014

(65) Prior Publication Data

US 2016/0062670 A1 Mar. 3, 2016

(51) Int. Cl.
*G06F 15/173* (2006.01)
*G06F 3/06* (2006.01)

(52) U.S. Cl.
CPC .......... *G06F 3/0683* (2013.01); *G06F 3/0613* (2013.01); *G06F 3/0653* (2013.01); *G06F 3/0659* (2013.01)

(58) Field of Classification Search
CPC .... G06F 3/0611; G06F 3/0635; G06F 3/0644; G06F 3/0653; G06F 3/0665; G06F 3/0683

See application file for complete search history.

(56) References Cited

U.S. PATENT DOCUMENTS

| 8,230,192 | B2 | 6/2012 | Balasubramanian et al. |
| 8,473,646 | B1 | 6/2013 | Certain et al. |
| 8,533,103 | B1 | 9/2013 | Certain et al. |
| 8,861,477 | B1* | 10/2014 | Goyal ............... H04W 36/0083 370/331 |
| 2004/0001493 | A1* | 1/2004 | Cloonan ................. H04L 47/10 370/395.42 |
| 2005/0094667 | A1* | 5/2005 | Dahlman ............. H04L 1/1819 370/473 |
| 2010/0106816 | A1 | 4/2010 | Gulati et al. |
| 2011/0072178 | A1* | 3/2011 | Mace .................... G06F 13/161 710/244 |
| 2012/0054329 | A1 | 3/2012 | Gulati et al. |
| 2012/0254643 | A1* | 10/2012 | Fetzer .................... G06F 1/324 713/320 |

OTHER PUBLICATIONS

Manning, P. et al., Storage I/O Control Technical Overview and Considerations for Deployment, (Research Paper), Aug. 2, 2010, 12 pps. http://www.vmware.com/files/pdf/techpaper/VMW-vSphere41-SIOC.pdf.

(Continued)

*Primary Examiner* — Hua Fan
(74) *Attorney, Agent, or Firm* — Hewlett Packard Enterprise Patent Department (57) ABSTRACT

Example implementations relate to determining, based on a system busy level, throughput of logical volumes. In example implementations, a system busy level may be increased in response to a determination that a latency goal associated with one of a plurality of logical volumes has not been met. A throughput for a subset of the plurality of logical volumes may be determined based on the system busy level.

20 Claims, 6 Drawing Sheets

(56) References Cited

OTHER PUBLICATIONS

Xu, Y. et al., Two-level Throughput and Latency to Control for Parallel File Systems, (Research Paper), Jan. 29, 2014, 7 pps. https://www.google.co.in/url?sa=t&rct=j&q=&esrc=s&source=web&cd=1&cad=rja&uact=8&ved=0CCcQFjAA&url=http%3A%2F%2Fvisa.cis.liu.ed%2Ftiki%2Ftiki-dowload_file.php%3Ffileid%3D146%26PHPSESSID%3D21112195b5d6abf7f33d06185812098f&ei=hUIjU_iJCoq2uAS4wIDQBw&usg=AFQjCNG5_OsJKKGQmps_jenurEDhe4QJtQ.
Jin et al., "Interposed proportional sharing for a storage service utility," May 3, 2004, <http://www.cs.unc.edu/~jasleen/papers/sigmetrics04.pdf> (13 pages).
Karlsson et al., "Triage: Performance Isolation and Differentiation for Storage Systems," Mar. 10, 2004, HPL-2004-40 (24 pages).
Wang et al. "Proportional-share scheduling for distributed storage systems," Feb. 2007, Proceedings of the 5th USENIX conference on File and Storage Technologies, USENIX Association (14 pages).
Xu et al., "vpfs: Bandwidth virtualization of parallel storage systems," 2012, IEEE 28th Symposium on Mass Storage Systems and Technologies (MSST) (12 pages).
Zhang et al., "Storage performance virtualization via throughput and latency control," Aug. 2006, ACM Transactions on Storage, vol. 2, No. 3, pp. 283-308, <https://www.researchgate.net/profile/Alma_Riska/publication/4180977_Storage_performance_virtualization_via_throughput_and_latency_control/links/0fcfd510a995ac16a9000000.pdf>.

\* cited by examiner

DETERMINING THROUGHPUT BASED ON SYSTEM BUSY LEVEL

BACKGROUND

Read and write commands may be directed at various storage devices in a storage system. The storage devices may share system resources. An acknowledgment may be sent after a read or write command is executed.

BRIEF DESCRIPTION OF THE DRAWINGS

The following detailed description references the drawings, wherein.

DETAILED DESCRIPTION

A storage system may include a plurality of logical volumes. A logical volume may be a physical storage device or a logical storage device. Input/Output (I/O) commands directed at logical volumes may originate from various hosts. As used herein, the term "I/O command" should be understood to refer to a command associated with data to be transferred to or from a logical volume. For example, an I/O command may be a command to read data from a logical volume, or a command to write data to a logical volume. After an I/O command is executed, an acknowledgment may be sent to the appropriate host (e.g., the host from which the I/O command originated).

Logical volumes in a storage system may share system resources, as allocating dedicated resources for each logical volume may not be cost-efficient. Different logical volumes may compete to obtain the shared resources. Logical volumes that have access to fewer resources may execute I/O commands more slowly than logical volumes that have access to more resources. In light of the above, the present disclosure provides for allocating resources based on priority and using latency to dynamically control throughput of logical volumes.

Figure 1:
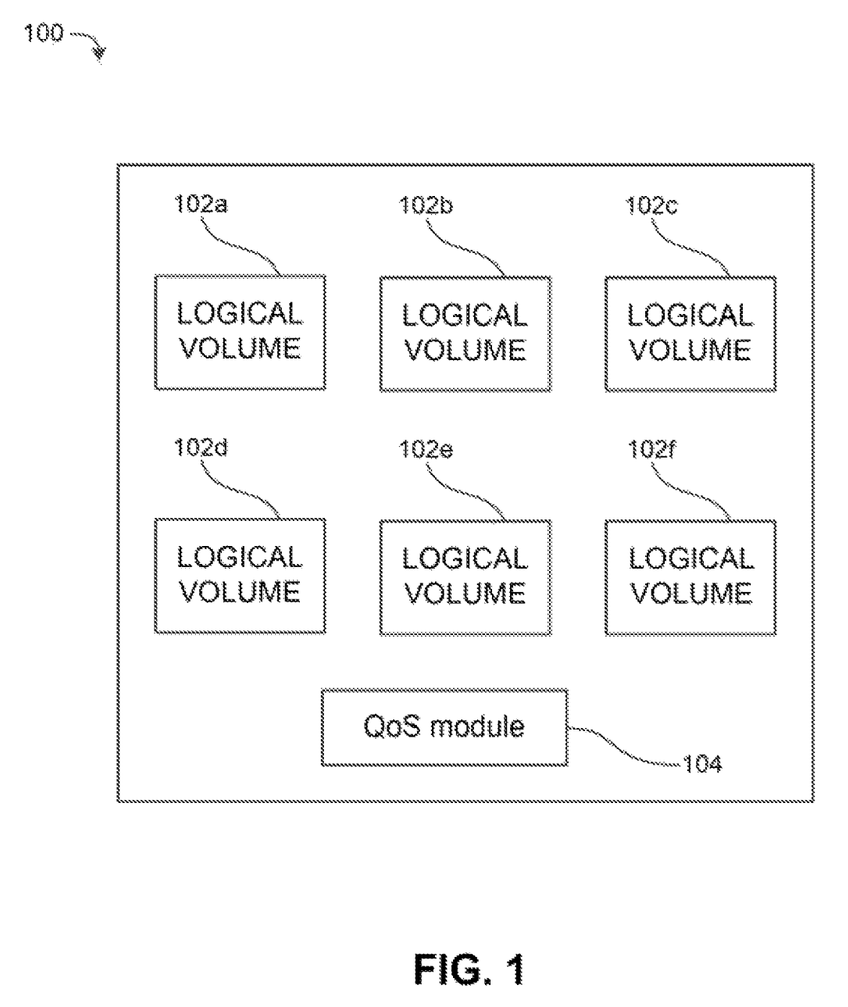
FIG. 1 is a block diagram of an example system for determining, based on a system busy level, throughput of logical volumes.

Referring now to the drawings, FIG. 1 is a block diagram of an example system 100 for determining, based on a system busy level, throughput of logical volumes. In FIG. 1, system 100 includes logical volumes 102a, 102b, 102c, 102d, 102e, and 102f. As used herein, the terms "include", "have", and "comprise" are interchangeable and should be understood to have the same meaning. Logical volumes 102a-f may include physical storage devices (e.g., a hard disk drive (HDD), solid-state drive (SSD), tape drive) and/or logical storage devices (e.g., a virtual disk). Although six logical volumes are shown in FIG. 1, it should be understood that system 100 may include additional logical volumes or fewer logical volumes, and that the concepts discussed herein may apply to systems with any number of logical volumes. Logical volumes 102a-f may share system resources. System resources may include, for example, memory, connection ports/adapters, caches, and/or processors.

Each of logical volumes 102a-f may be associated with a respective latency goal. As used herein, the term "latency goal" should be understood to refer to a length of time below which a logical volume should be able to complete execution an I/O command. The length of time may be measured, for example, from the time the logical volume receives the I/O command. A latency goal associated with a logical volume is "met" when the logical volume completes execution of each I/O command, that is directed at the logical volume, in an amount of time less than or equal to the latency goal. For example, if logical volume 102a is associated with a latency goal of 1 millisecond, the latency goal is met if logical volume 102a completes execution of each I/O command, that is directed at logical volume 102a, in 1 millisecond or less (e.g., from the time logical volume 102a receives each respective I/O command). A latency goal associated with a logical volume is "not met" when the logical volume takes an amount of time longer than the latency goal to complete execution of an I/O command that is directed at the logical volume. For example, if logical volume 102c is associated with a latency goal of 5 milliseconds, the latency goal is not met if logical volume 102c takes 6 milliseconds to complete execution of an I/O command that is directed at logical volume 102c.

System 100 of FIG. 1 also includes QoS module 104. A module may include a set of instructions encoded on a machine-readable storage medium and executable by a processor. In addition or as an alternative, a module may include a hardware device comprising electronic circuitry for implementing the functionality described below. QoS module 104 may increase, in response to a determination that a latency goal associated with one of logical volumes 102a-f has not been met, a system busy level. A system busy level is an indication of how well a group of logical volumes are collectively meeting their associated latency goals. A low system busy level may indicate that most latency goals are being met. A high system busy level may indicate that several latency goals are not being met.

In some implementations, the system busy level may be a value between a minimum of 0 and a maximum of 100. The system busy level may be calculated periodically (e.g., every 10 milliseconds). When calculating the system busy level, QoS module 104 may determine the direction in which the system busy level should move (e.g., up if any latency goal has been missed during the time between the last calculation and the current calculation; down if not), and adjust the system busy level by a certain percentage (e.g., 10%) of the range that is left in the determined direction. For example, if the system busy level was previously calculated to be 10 and QoS module 104 determines that the system busy level should go up for the current calculation. QoS module 104 may increase the system busy level by 9 (which is 10% of the difference between the previously calculated value of 10 and the maximum value of 100, i.e., 10% of 90), such that the value of the system busy level is increased to 19. If the system busy level was previously calculated to be 10 and QoS module 104 determines that the system busy level should go down for the current calculation, QoS module 104 may decrease the system busy level by 1 (which is 10% of the difference between the previously calculated value of 10 and the minimum value of 0, i.e., 10% of 10), such that the value of the system busy level is decreased to 9.

QoS module 104 may determine, based on the system busy level, a throughput for a subset of logical volumes 102a-f. As used herein, the term "throughput" should be understood to refer to a measure of the amount of data processed by a logical volume per unit of time. Throughput may be expressed, for example, in I/O's executed per second (IOPS) or megabytes per second (MB/s). The determined throughput may be lower than a throughput for the subset of logical volumes 102a-f prior to the increase in the system busy level. For example, the subset may include logical volumes 102b and 102e, and different system busy levels may correspond to respective throughput levels for logical volumes 102b and 102e. In some implementations, a system busy level of 10 may correspond to a throughput of 5000 IOPS being determined for logical volumes 102b and 102e, and a system busy level of 25 may correspond to a throughput of 3000 IOPS being determined for logical volumes 102b and 102e.

In some implementations, throughput of a subset of logical volumes may increase/decrease linearly as the system busy level decreases/increases over a specified range. The throughputs of different subsets of logical volumes may change over different ranges of system busy level. For example, a subset that includes logical volumes 102b and 102e may experience a linear decrease in throughput as the system busy level increases from 0 to 25, while the throughputs of logical volumes 102a, 102c-d, and 102f stay the same for that range of system busy level. As the system busy level increases from 25 to 50, a subset that includes logical volumes 102d and 102f may experience a linear decrease in throughput, while the throughputs of logical volumes 102a-c and 102e stay the same. As the system busy level increases from 50 to 100, a subset that includes logical volumes 102a and 102c may experience a linear decrease in throughput, while the throughputs of logical volumes 102b and 102d-f stay the same. Different subsets may be associated with different priority levels, as discussed below. It should be understood that different subsets may have different numbers of logical volumes, that throughputs may change non-linearly over a range of system busy level values, and that different ranges of system busy level values other than those discussed herein may be used.

After an I/O command is executed, an acknowledgment may be sent to a host from which an I/O command originated. Acknowledgements to hosts may be delayed to prevent hosts from sending more I/O commands, or to slow down the rate at which hosts send I/O commands. A delay in the transmission of an acknowledgment to a host may be referred to herein as an "acknowledgment delay". In some implementations, QoS module 104 may determine, based on the determined throughput, a length of an acknowledgment delay for an I/O command directed at one of the subset of logical volumes 102a-f. Lower throughputs may lead to longer lengths of acknowledgment delays being determined. Higher throughputs may lead to shorter lengths of acknowledgment delays being determined, or a determination that an acknowledgment should not be delayed at all. Delaying acknowledgment delays for some (e.g., lower priority) logical volumes may render such logical volumes more idle, freeing up shared resources for other (e.g., higher priority) logical volumes to use.

In some implementations, the subset of logical volumes 102a-f may be a first subset of logical volumes 102a-f. The first subset may be associated with a first priority level. Priority levels may be associated with logical volumes or groups of logical volumes based on the importance of I/O commands being executed by the logical volumes. For example, a logical volume that is executing system-critical I/O commands or that is assigned to a top tier of a service level agreement (SLA) may be designated as high priority. Logical volumes that are executing less critical I/O commands or that are assigned to lower tiers of an SLA may be designated as medium priority or low priority. Any number of priority level designations may be used. The first subset may be made up of logical volumes that have the same priority level (i.e., the first priority level).

The first priority level may be associated with a first ceiling throughput and a first floor throughput. As used herein the term "ceiling throughput" should be understood to refer to a threshold of throughput above which execution of I/O commands will be throttled. If a throughput of a logical volume rises above the ceiling throughput for the logical volume, throttling mechanisms (e.g., acknowledgment delays) may be used to reduce the throughput to the ceiling throughput. As used herein, the term "floor throughput" should be understood to refer to a threshold of throughput below which execution of I/O commands will not be throttled. If a throughput of a logical volume drops below the floor throughput for the logical volume, throttling mechanisms may not be applied even if the latency goal associated with the logical volume is not met. Different priority levels may be associated with different ceiling and floor throughputs. For example, a higher priority level may be associated with a ceiling throughput that is higher than that of a lower priority level, and with a floor throughput that is higher than that of a lower priority level.

In some implementations, the latency goal determined not to have been met may be associated with a logical volume in the first subset. In such implementations, the throughput of the logical volume whose latency goal was not met may be decreased. In some implementations, the latency goal determined not to have been met may be associated with a logical volume in a second subset of logical volumes 102a-f. In such implementations, the throughput of the logical volume whose latency goal was not met may not be decreased. The second subset may be associated with a second priority level. The second priority level may be associated with a second ceiling throughput and a second floor throughput.

In some implementations, QoS module 104 may decrease, as the system busy level increases from a first value to a second value, throughput of logical volumes in the first subset while maintaining throughput of logical volumes in the second subset. QoS module 104 may decrease, in response to an increase in the system busy level, and if throughput of logical volumes in the first subset is at the first floor throughput, throughput of logical volumes in the second subset. The second priority level may be higher than the first priority level, which may be why throughput of logical volumes in the first subset is decreased before throughput of logical volumes in the second subset.

In some implementations, QoS module 104 may decrease, in response to a determination that all latency goals associated with the logical volumes in system 100 have been met, the system busy level. For example, the system busy level may be decreased by ten percent, as discussed above. QoS module 104 may increase, based on the system busy level, throughput of some of the logical volumes in system 100.

Throughput of a subset of logical volumes associated with a higher priority level may be increased before throughput of a subset of logical volumes associated with a lower priority level. For example, if throughput of a subset of logical volumes designated as high priority is below the ceiling throughput associated with that subset, the throughput of that subset may be increased in response to the decrease in system busy level, while the throughput of low- and medium-priority subsets remain the same. If the system busy level decreases from a first value to a second value, the throughput of the appropriate logical volumes may increase by the same amount as the amount the throughput would have decreased had the system busy level increased from the second value to the first value.

Figure 2:
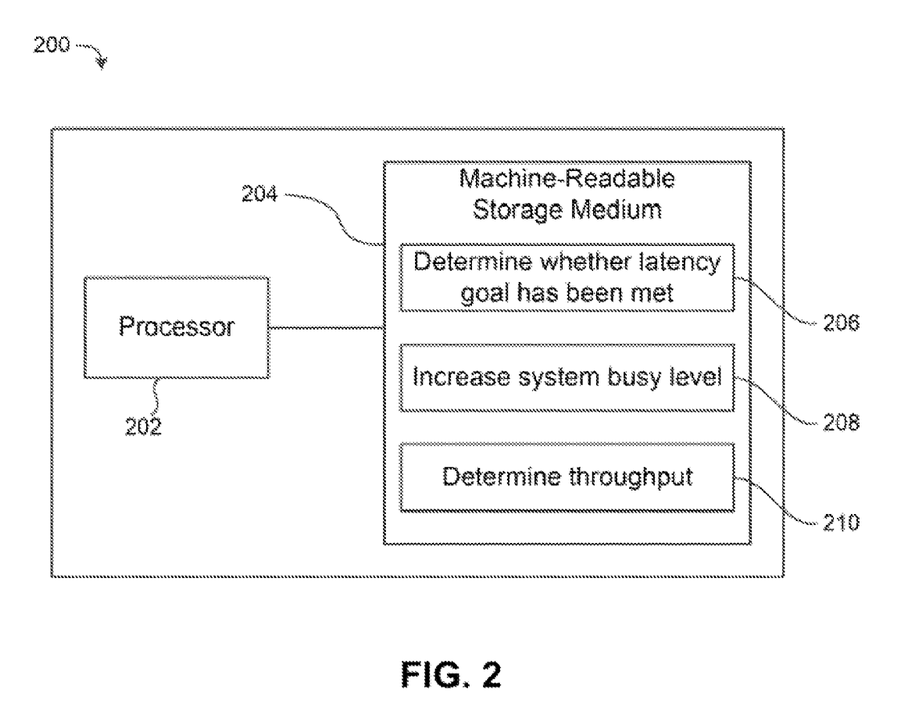
FIG. 2 is a block diagram of an example device that includes a machine-readable storage medium encoded with instructions to determine, based on a system busy level, a throughput for a subset of a plurality of logical volumes.

FIG. 2 is a block diagram of an example device 200 that includes a machine-readable storage medium encoded with instructions to determine, based on a system busy level, a throughput for a subset of a plurality of logical volumes. In some implementations, device 200 may operate as and/or be part of a server. In FIG. 2, device 200 includes processor 202 and machine-readable storage medium 204.

Processor 202 may include a central processing unit (CPU), microprocessor (e.g., semiconductor-based microprocessor), and/or other hardware device suitable for retrieval and/or execution of instructions stored in machine-readable storage medium 204. Processor 202 may fetch, decode, and/or execute instructions 206, 208, and 210. As an alternative or in addition to retrieving and/or executing instructions, processor 202 may include an electronic circuit comprising a number of electronic components for performing the functionality of instructions 206, 208, and/or 210.

Machine-readable storage medium 204 may be any suitable electronic, magnetic, optical, or other physical storage device that contains or stores executable instructions. Thus, machine-readable storage medium 204 may include, for example, a random-access memory (RAM), an Electrically Erasable Programmable Read-Only Memory (EEPROM), a storage device, an optical disc, and the like. In some implementations, machine-readable storage medium 204 may include a non-transitory storage medium, where the term "non-transitory" does not encompass transitory propagating signals. As described in detail below, machine-readable storage medium 204 may be encoded with a set of executable instructions 206, 208, and 210. In some examples, machine-readable storage medium 204 may be an implementation of QoS module 104.

Instructions 206 may determine whether a latency goal associated with one of a plurality of logical volumes has been met. The plurality of logical volumes may share system resources. The plurality of logical volumes may include, for example, logical volumes 102a-f.

Instructions 208 may increase, in response to a determination that the latency goal has not been met, a system busy level. The system busy level may be a value between a minimum of 0 and a maximum of 100. In some implementations, instructions 208 may increase the system busy level by a certain percentage (e.g., 10%) of the range that is left between the last-determined value of the system busy level and the maximum system busy level, as discussed above with respect to FIG. 1.

Instructions 210 may determine, based on the system busy level, a throughput for a subset of the plurality of logical volumes. In some implementations, the latency goal determined not to have been met may be associated with a logical volume in the subset. In some implementations, the latency goal determined not to have been met may be associated with a logical volume that is not in the subset. The determined throughput may be lower than a throughput for the subset of the plurality of logical volumes prior to the increase in the system busy level. Different system busy levels may correspond to respective throughput levels for the subset, and the throughput of the subset may increase/decrease linearly as the system busy level decreases/increases over a specified range, as discussed above with respect to FIG. 1.

Figure 3:
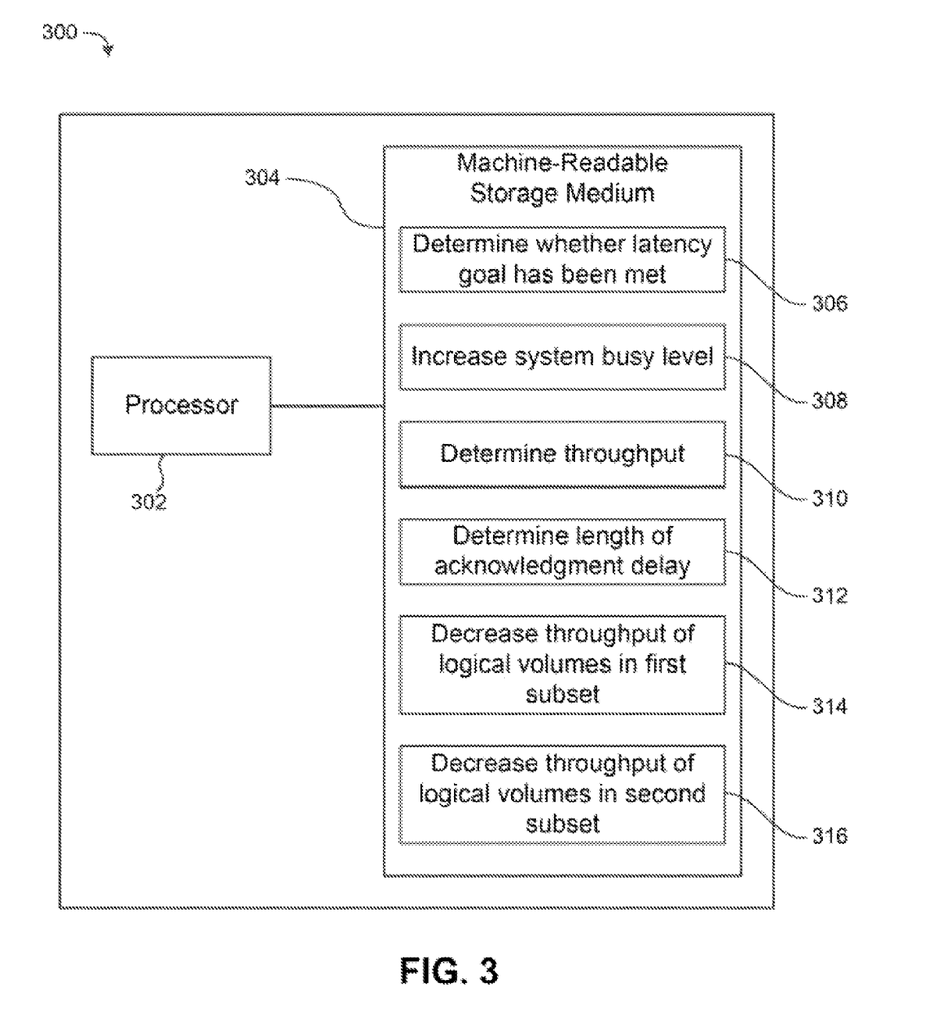
FIG. 3 is a block diagram of an example device that includes a machine-readable storage medium encoded with instructions to enable decreasing throughput of logical volumes in response to increases in system busy level.

FIG. 3 is a block diagram of an example device 300 that includes a machine-readable storage medium encoded with instructions to enable decreasing throughput of logical volumes in response to increases in system busy level. In some implementations, device 300 may operate as and/or be part of a server. In FIG. 3, device 300 includes processor 302 and machine-readable storage medium 304.

As with processor 202 of FIG. 2, processor 302 may include a CPU, microprocessor (e.g., semiconductor-based microprocessor), and/or other hardware device suitable for retrieval and/or execution of instructions stored in machine-readable storage medium 304. Processor 302 may fetch, decode, and/or execute instructions 306, 308, 310, 312, 314, and 316 to enable decreasing throughput of logical volumes in response to increases in system busy level, as described below. As an alternative or in addition to retrieving and/or executing instructions, processor 302 may include an electronic circuit comprising a number of electronic components for performing the functionality of instructions 306, 308, 310, 312, 314, and/or 316.

As with machine-readable storage medium 204 of FIG. 2, machine-readable storage medium 304 may be any suitable physical storage device that stores executable instructions. In some examples, machine-readable storage medium 304 may be an implementation of QoS module 104. Instructions 306, 308, and 310 on machine-readable storage medium 304 may be analogous to (e.g., have functions and/or components similar to) instructions 206, 208, and 210, respectively, on machine-readable storage medium 204. Instructions 312 may determine, based on a determined throughput, a length of an acknowledgment delay for an I/O command directed at one of a subset of a plurality of logical volumes. The plurality of logical volumes (e.g., logical volumes 102a-f) may share system resources. Lower throughputs may lead to longer lengths of acknowledgment delays being determined. Higher throughputs may lead to shorter lengths of acknowledgment delays being determined, or a determination that an acknowledgment should not be delayed at all.

In some implementations the subset of the plurality of logical volumes may be a first subset of the plurality of logical volumes. The first subset may be associated with a first priority level. A second subset of the plurality of logical volumes may be associated with a second priority level. Instructions 314 may decrease, as the system busy level increases from a first value to a second value, throughput of logical volumes in the first subset while maintaining throughput of logical volumes in the second subset. The second priority level may be higher than the first priority level; as throughput of logical volumes in the first subset decreases, shared resources may be freed for use by logical volumes in the second subset.

In some implementations, the first priority level may be associated with a first ceiling throughput and a first floor throughput. The second priority level may be associated with a second ceiling throughput and a second floor throughput. If the second priority level is higher than the first priority level, the second ceiling throughput may be higher than the first ceiling throughput, and the second floor throughput may be higher than the first floor throughput.

Instructions 316 may decrease, in response to an increase in the system busy level, and if throughput of logical volumes in the first subset is at the first floor throughput, throughput of logical volumes in the second subset. The second priority level may be higher than the first priority level, and throughput of logical volumes in a lower-priority subset (e.g., the first subset) may be decreased, as system busy level increases, to a respective floor throughput before throughput of logical volumes in a higher-priority subset (e.g., the second subset) is decreased.

Figure 4:
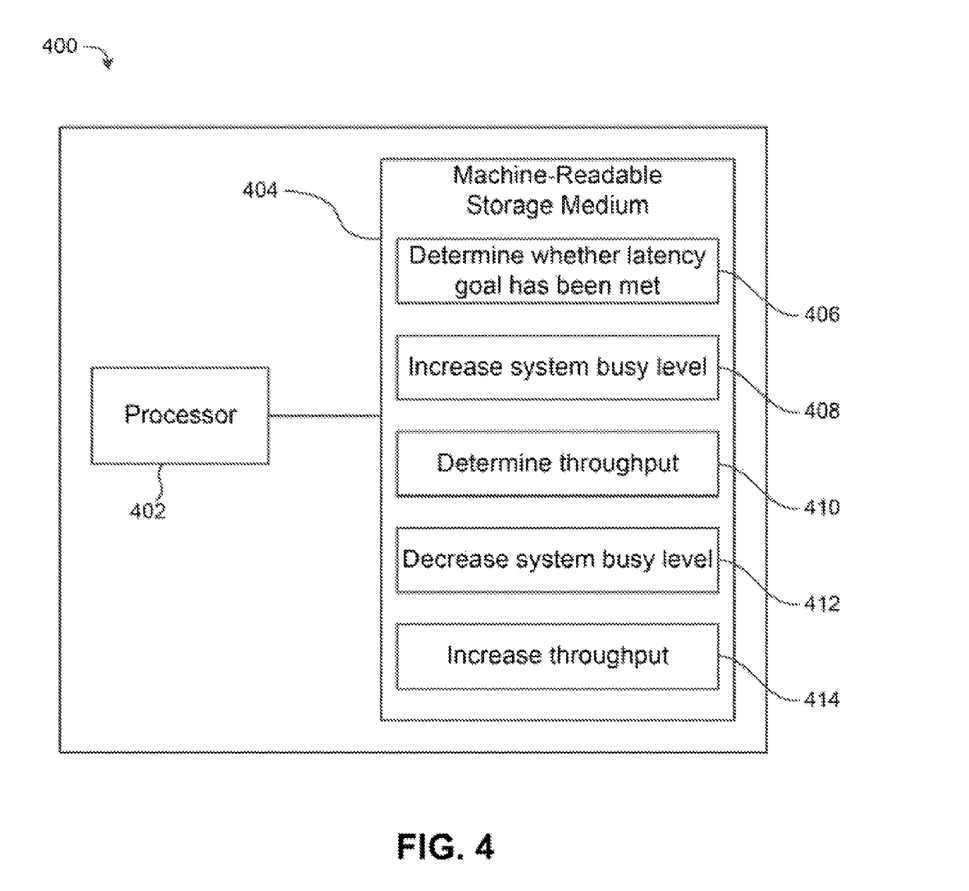
FIG. 4 is a block diagram of an example device that includes a machine-readable storage medium encoded with instructions to enable increasing throughput of logical volumes in response to a decrease in system busy level.

FIG. 4 is a block diagram of an example device 400 that includes a machine-readable storage medium encoded with instructions to enable increasing throughput of logical volumes in response to a decrease in system busy level. In some implementations, device 400 may operate as and/or be part of a server. In FIG. 4, device 400 includes processor 402 and machine-readable storage medium 404.

As with processor 202 of FIG. 2, processor 402 may include a CPU, microprocessor (e.g., semiconductor-based microprocessor), and/or other hardware device suitable for retrieval and/or execution of instructions stored in machine-readable storage medium 404. Processor 402 may fetch, decode, and/or execute instructions 406, 408, 410, 412, and 414 to enable increasing throughput of logical volumes in response to a decrease in system busy level, as described below. As an alternative or in addition to retrieving and/or executing instructions, processor 402 may include an electronic circuit comprising a number of electronic components for performing the functionality of instructions 406, 408, 410, 412, and/or 414.

As with machine-readable storage medium 204 of FIG. 2, machine-readable storage medium 404 may be any suitable physical storage device that stores executable instructions. In some examples, machine-readable storage medium 404 may be an implementation of QoS module 104. Instructions 406, 408, and 410 on machine-readable storage medium 404 may be analogous to instructions 206, 208, and 210, respectively, on machine-readable storage medium 204. Instructions 412 may decrease, in response to a determination that all latency goals associated with a plurality of logical volumes have been met, a system busy level. The plurality of logical volumes (e.g., logical volumes 102*a-f*) may share system resources. In some implementations, the system busy level may be a value between a minimum of 0 and a maximum of 100, and instructions 412 may decrease the system busy level by ten percent each time a determination is made that all latency goals have been met, as discussed above with respect to FIG. 1.

Instructions 414 may increase, based on the system busy level, throughput of some of the plurality of logical volumes. Throughput of a subset of logical volumes associated with a higher priority level may be increased before throughput of a subset of logical volumes associated with a lower priority level. For example, if throughput of a first subset of logical volumes designated as high priority is below the ceiling throughput associated with the first subset, the throughput of the first subset may be increased in response to the decrease in system busy level, while the throughput of low- and medium-priority subsets remain the same. When the throughput of the first subset reaches the ceiling throughput associated with the first subset, the throughput of a second subset of logical volumes designated as medium priority may be increased as the system busy level decreases further, while the throughput of the first subset and of a third subset of logical volumes designated as low priority remain the same (e.g., at the ceiling throughput associated with the first subset and at the floor throughput associated with the third subset, respectively). Similarly, when the throughput of the second subset reaches the ceiling throughput associated with the second subset, the throughput of the third subset may be increased as the system busy level decreases further, while the respective throughputs of the first and second subsets remain the same (e.g., at the respective ceiling throughputs). If the system busy level decreases from a first value to a second value, the throughput of the appropriate logical volumes may increase by the same amount as the amount the throughput would have decreased had the system busy level increased from the second value to the first value.

Figure 5:
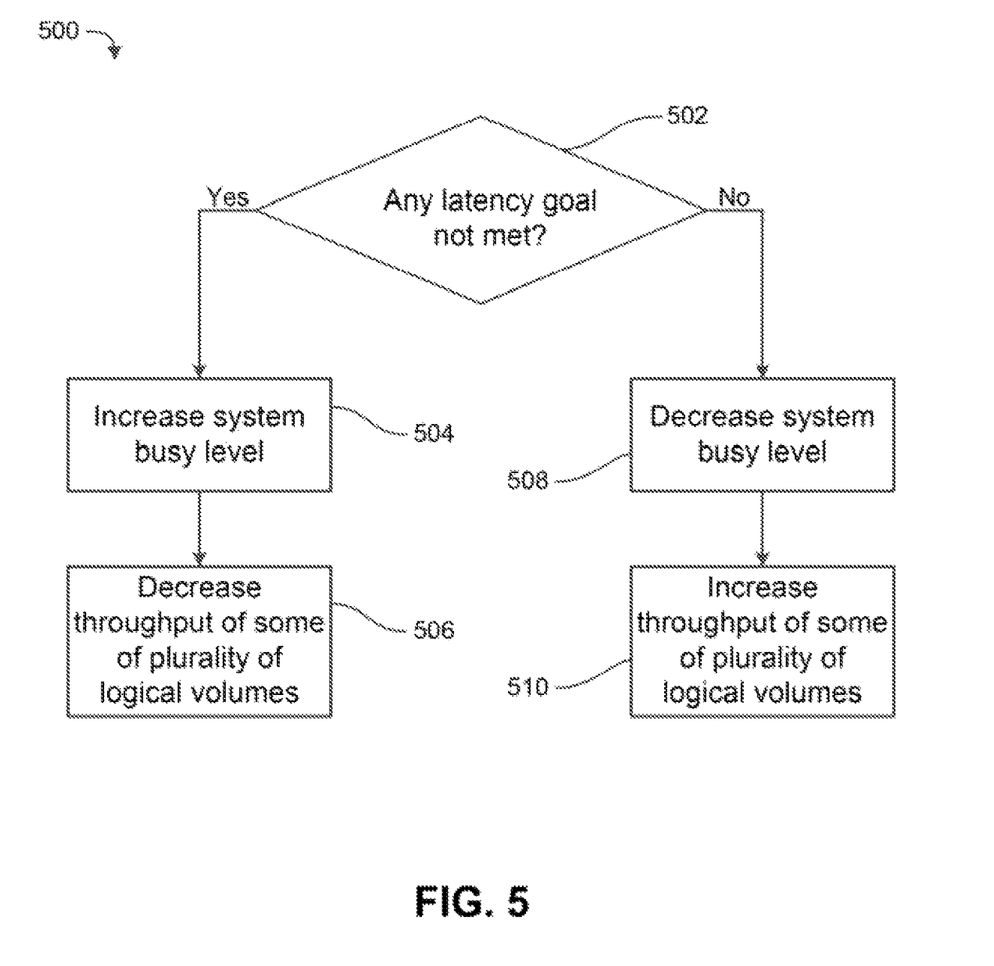
FIG. 5 is a flowchart of an example method for changing throughput of logical volumes in response to changes in system busy level.
Figure 6:
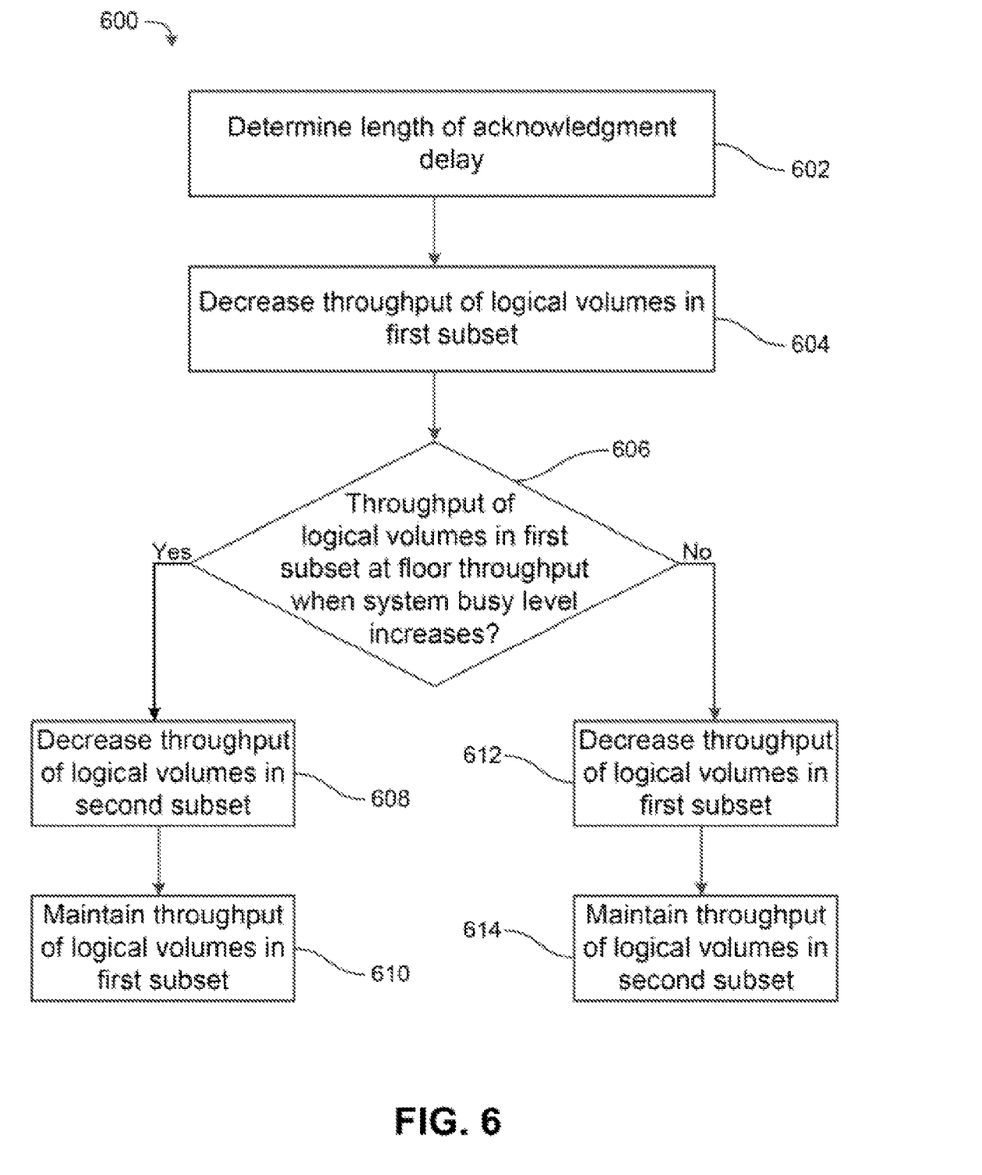
FIG. 6 is a flowchart of an example method for changing throughputs of subsets of a plurality of logical volumes.

Methods related to determining throughput based on system busy level are discussed with respect to FIGS. 5-6. FIG. 5 is a flowchart of an example method 500 for changing throughput of logical volumes in response to changes in system busy level. Although execution of method 500 is described below with reference to processor 402 of FIG. 4, it should be understood that execution of method 500 may be performed by other suitable devices, such as processors 202 and 302 of FIGS. 2 and 3, respectively. Method 500 may be implemented in the form of executable instructions stored on a machine-readable storage medium and/or in the form of electronic circuitry.

Method 500 may start in block 502, where processor 402 may determine whether any latency goal associated with any of a plurality of logical volumes has not been met. System resources may be shared between the plurality of logical volumes (e.g., logical volumes 102*a-f*). If processor 402 determines that a latency goal associated with one of the plurality of logical volumes has not been met, method 500 may proceed to block 504, in which processor 402 may increase a system busy level. The system busy level may be value between a minimum of 0 and a maximum of 100. In some implementations, processor 402 may increase the system busy level by a certain percentage (e.g., 10%) of the range that is left between the last-determined value of the system busy level and the maximum system busy level, as discussed above with respect to FIG. 1.

Next, in block 506, processor 402 may decrease throughput of some of the plurality of logical volumes in response to the increase in the system busy level. The throughputs of different subsets of logical volumes may change over different ranges of system busy level, as discussed above with respect to FIG. 1. Throughput of logical volumes in a lower priority subset of the plurality of logical volumes may be decreased, as system busy level increases, to a respective floor throughput before throughput of logical volumes in a higher-priority subset of the plurality of logical volumes is decreased, as discussed above with respect to FIG. 3.

If, in block 502, processor 402 determines that there is no latency goal that has not been met (e.g., all latency goals associated with the plurality of logical volumes have been met), method 500 may proceed to block 508, in which processor 402 may decrease the system busy level. In some implementations, processor 402 may decrease the system busy level by ten percent each time a determination is made that all latency goals have been met, as discussed above with respect to FIG. 1.

Next, in block 510, processor 402 may increase throughput of some of the plurality of logical volumes in response to the decrease in the system busy level. Throughput of a subset of logical volumes associated with a higher priority level may be increased before throughput of a subset of logical volumes associated with a lower priority level, as discussed above with respect to FIG. 4. If the system busy level decreases from a first value to a second value, the throughput of the appropriate logical volumes may increase by the same amount as the amount the throughput would have decreased had the system busy level increased from the second value to the first value.

FIG. 6 is a flowchart of an example method 600 for changing throughputs of subsets of a plurality of logical volumes. Although execution of method 600 is described below with reference to processor 302 of FIG. 3, it should be understood that execution of method 600 may be performed by other suitable devices, such as processors 202 and 402 of FIGS. 2 and 4, respectively. Some blocks of method 600 may be performed in parallel with and/or after method 500. Method 600 may be implemented in the form of executable instructions stored on a machine-readable storage medium and/or in the form of electronic circuitry.

Method 600 may start in block 602, where processor 302 may determine, based on a throughput associated with a current value of the system busy level, a length of an acknowledgment delay for an I/O command directed at one of a plurality of logical volumes. The plurality of logical volumes (e.g., logical volumes 102a-f) may share system resources. Lower throughputs may lead to longer lengths of acknowledgment delays being determined. Higher throughputs may lead to shorter lengths of acknowledgment delays being determined, or a determination that an acknowledgment should not be delayed at all.

In block 604, processor 302 may decrease, as a system busy level increases from a first value to a second value, throughput of logical volumes in a first subset of the plurality of logical volumes while maintaining throughput of logical volumes in a second subset of the plurality of logical volumes. The first subset may be associated with a first priority level. The first priority level may be associated with a first ceiling throughput and a first floor throughput. The second subset may be associated with a second priority level. The second priority level may be associated with a second ceiling throughput and a second floor throughput. The second priority level may be higher than the first priority level.

In block 606, processor 302 may determine whether the throughput of logical volumes in the first subset is at the first floor throughput when the system busy level increases. If processor 302 determines that the throughput of logical volumes in the first subset is at the first floor throughput when the system busy level increases, method 600 may proceed to block 608, in which processor 302 may decrease throughput of logical volumes in the second subset in response to the increase in the system busy level. In block 610, processor 302 may maintain throughput of logical volumes in the first subset. Although block 610 is shown below block 608 in FIG. 6, it should be understood that the elements of block 610 may be performed before or in parallel with the elements of block 608.

If, in block 606, processor 302 determines that the throughput of logical volumes in the first subset is not at the first floor throughput when the system busy level increases, method 600 may proceed to block 612, in which processor 302 may decrease throughput of logical volumes in the first subset in response to the increase in the system busy level. In block 614, processor 302 may maintain throughput of logical volumes in the second subset. Although block 614 is shown below block 612 in FIG. 6, it should be understood that the elements of block 614 may be performed before or in parallel with the elements of block 612.

The foregoing disclosure describes determining, based on a system busy level, throughput or a plurality of logical volumes. Example implementations described herein enable allocating resource based on priority and using latency to dynamically control throughput of logical volumes.

We claim:

1. A system comprising:
   a plurality of logical volumes, wherein each of the plurality of logical volumes is associated with a respective latency goal, and wherein the plurality of logical volumes are to share system resources;
   a processor; and
   a non-transitory storage medium storing instructions executable on the processor to:
   increase, in response to a determination that a latency goal associated with one of the plurality of logical volumes has not been met, a value of a system busy level from a first system busy level value to a second, higher system busy level value;
   change, based on the increase of the value of the system busy level, a value of a throughput for a subset of the plurality of logical volumes from a first throughput value to a second throughput value, wherein the second throughput value is lower than the first throughput value for the subset of the plurality of logical volumes prior to the increase in the value of the system busy level; and
   responsive to the changed value of the throughput, throttle input/output (I/O) commands from a host to a logical volume of the subset of the plurality of logical volumes.

2. The system of claim 1, wherein the instructions are executable on the processor to throttle the I/O commands from the host by increasing, based on the changed value of the throughput, a length of an acknowledgment delay for an I/O command directed at the logical volume of the subset of the plurality of logical volumes, wherein the acknowledgment delay is a delay in transmitting, by the logical volume of the subset of the plurality of logical volumes, an acknowledgment to the host in response to an I/O command received by the logical volume of the subset of the plurality of logical volumes from the host.

3. The system of claim 1, wherein:
   the subset of the plurality of logical volumes is a first subset of the plurality of logical volumes;
   the first subset is associated with a first priority level;
   the latency goal determined not to have been met is associated with a logical volume in a second subset of the plurality of logical volumes; and
   the second subset is associated with a second priority level.

4. The system of claim 1, wherein:
   the subset of the plurality of logical volumes is a first subset of the plurality of logical volumes;
   the first subset is associated with a first priority level;
   the first priority level is associated with a first ceiling throughput and a first floor throughput;
   a second subset of the plurality of logical volumes is associated with a second priority level;
   the second priority level is associated with a second ceiling throughput and a second floor throughput; and
   the instructions are executable on the processor is to decrease, as the value of the system busy level increases from the first system busy level value to the second system busy level value, the value of the throughput of logical volumes in the first subset while maintaining a value of a throughput of logical volumes in the second subset.

5. The system of claim 4, wherein the instructions are executable on the processor further to decrease, in response to the increase in the value of the system busy level, and if the value of the throughput of logical volumes in the first subset is at the first floor throughput, the value of the throughput of logical volumes in the second subset.

6. The system of claim 1, wherein the instructions are executable on the processor further to:
   decrease, in response to a determination that all latency goals associated with the plurality of logical volumes have been met, the value of the system busy level;
   increase, based on the decreased value of the system busy level, a value of a throughput of some of the plurality of logical volumes; and
   in response to the increased value of the throughput, reduce throttling of I/O commands to the some of the plurality of logical volumes.

7. The system of claim 6, wherein the reducing of the throttling comprises reducing an acknowledgment delay for an I/O command directed to a logical volume.

8. The system of claim 1, wherein increasing the value of the system busy level comprises incrementally increasing the value of the busy system level a plurality of times by respective increments, while the latency goal associated with one of the plurality of logical volumes has not been met.

9. The system of claim 8, wherein the instructions are executable on the processor further to:
   incrementally decrease, while all latency goals associated with the plurality of logical volumes have been met, the value of the system busy level a plurality of times by respective decrements;
   increase, based on each decreased value of the system busy level, a value of a throughput of some of the plurality of logical volumes; and
   in response to the increased value of the throughput, reduce throttling of I/O commands to the some of the plurality of logical volumes.

10. The system of claim 9, wherein each increment of the increments is calculated based on a range between a current value of the system busy level and a maximum value of the system busy level, and
   each decrement of the decrements is calculated based on a range between the current value of the system busy level and a minimum value of the system busy level.

11. A non-transitory machine-readable storage medium encoded with instructions that upon execution cause a system comprising a processor to:
   determine whether a latency goal associated with one of a plurality of logical volumes has been met, wherein the plurality of logical volumes are to share system resources;
   increase, in response to a determination that the latency goal has not been met, a value of a system busy level from a first system busy level value to a second, higher system busy level value;
   decrease, based on the increased value of the system busy level, a value of a throughput for a subset of the plurality of logical volumes from a first throughput value to a second throughput value, wherein the second throughput value is lower than the first throughput value for the subset of the plurality of logical volumes prior to the increase in the value of the system busy level; and
   responsive to the decreased value of the throughput, throttle input/output (I/O) commands from a host to a logical volume of the subset of the plurality of logical volumes.

12. The non-transitory machine-readable storage medium of claim 11, wherein the throttling comprises increasing, based on the decreased value of the throughput, a length of an acknowledgment delay for an I/O command directed at the logical volume of the subset of the plurality of logical volumes.

13. The non-transitory machine-readable storage medium of claim 11, wherein:
   the subset of the plurality of logical volumes is a first subset of the plurality of logical volumes;
   the first subset is associated with a first priority level;
   a second subset of the plurality of logical volumes is associated with a second priority level; and
   the instructions upon execution cause the system to decrease, as the value of the system busy level increases from the first system busy level value to the second system busy level value, the value of the throughput of logical volumes in the first subset while maintaining a value of a throughput of logical volumes in the second subset.

14. The non-transitory machine-readable storage medium of claim 11, wherein the instructions upon execution cause the system to further:
   decrease, in response to a determination that all latency goals associated with the plurality of logical volumes have been met, the value of the system busy level; and
   increase, based on the decreased value of the system busy level, a value of a throughput of some of the plurality of logical volumes.

15. The non-transitory machine-readable storage medium of claim 14, wherein the instructions upon execution cause the system to, in response to the increased value of the throughput, reduce throttling of I/O commands to the some of the plurality of logical volumes.

16. The non-transitory machine-readable storage medium of claim 15, wherein the reducing of the throttling comprises reducing an acknowledgment delay for an I/O command directed to a logical volume.

17. The non-transitory machine-readable storage medium of claim 11, wherein the subset of the plurality of logical volumes is a first subset of the plurality of logical volumes, and wherein the instructions upon execution cause the system to:
   decrease, based on the increased value of the system busy level, the value of the throughput for the first subset of the plurality of logical volumes from the first throughput value to the second throughput value, while maintaining unchanged a value of a throughput of logical volumes in a second subset of the plurality of logical volumes.

18. A method of a system comprising a processor, comprising:
   determining whether any latency goal associated with any of a plurality of logical volumes has not been met, wherein system resources are shared between the plurality of logical volumes;
   increasing, in response to a determination that a latency goal associated with one of the plurality of logical volumes has not been met, a value of a system busy level from a first system busy level value to a second, higher system busy level value;
   decreasing a value of a throughput of some of the plurality of logical volumes from a first throughput value to a second throughput value, in response to the increased value of the system busy level;
   responsive to the decreased value of the throughput, increasing an acknowledgement delay for input/output (I/O) commands directed to a logical volume of the some of the plurality of logical volumes to throttle delivery of the I/O commands;

causing throttling of the I/O commands responsive to the increasing of the acknowledgment delay;

decreasing, in response to a determination that all latency goals associated with the plurality of logical volumes have been met, the value of the system busy level; and increasing a value of a throughput of some of the plurality of logical volumes in response to the decreased value of the system busy level.

19. The method of claim 18, wherein:

a first subset of the plurality of logical volumes is associated with a first priority level;

the first priority level is associated with a first ceiling throughput and a first floor throughput;

a second subset of the plurality of logical volumes is associated with a second priority level;

the second priority level is associated with a second ceiling throughput and a second floor throughput; and the method further comprises decreasing, as the value of the system busy level increases from the first system busy level value to the second system busy level value, a value of a throughput of logical volumes in the first subset while maintaining a value of a throughput of logical volumes in the second subset.

20. The method of claim 19, further comprising decreasing, in response to the increase in the value of the system busy level, and if the value of the throughput of logical volumes in the first subset is at the first floor throughput, a value of a throughput of logical volumes in the second subset.

\* \* \* \* \*